United States Patent
Iwasa et al.

(10) Patent No.: US 11,697,592 B2
(45) Date of Patent: Jul. 11, 2023

(54) METHOD FOR PRODUCING CARBON NANOTUBES

(71) Applicants: Osaka Soda Co., Ltd., Osaka (JP); Meijo Nano Carbon Co., Ltd., Nagoya (JP)

(72) Inventors: Naruhito Iwasa, Osaka (JP); Daigo Hirayama, Osaka (JP); Jitsuo Oda, Osaka (JP); Yasushi Miki, Osaka (JP); Hisato Kagawa, Osaka (JP); Takeshi Hashimoto, Nagoya (JP); Kei Takano, Nagoya (JP)

(73) Assignees: Osaka Soda Co., Ltd., Osaka (JP); Meijo Nano Carbon Co., Ltd., Nagoya (JP)

(*) Notice: Subject to any disclaimer, the term of this patent is extended or adjusted under 35 U.S.C. 154(b) by 0 days.

(21) Appl. No.: 17/264,653

(22) PCT Filed: Jul. 26, 2019

(86) PCT No.: PCT/JP2019/029533
§ 371 (c)(1),
(2) Date: Jan. 29, 2021

(87) PCT Pub. No.: WO2020/027000
PCT Pub. Date: Feb. 6, 2020

(65) Prior Publication Data
US 2021/0331924 A1    Oct. 28, 2021

(30) Foreign Application Priority Data
Jul. 31, 2018  (JP) .................................. 2018-143537

(51) Int. Cl.
*C01B 32/162*    (2017.01)
*C01B 32/159*    (2017.01)
(Continued)

(52) U.S. Cl.
CPC ............. *C01B 32/162* (2017.08); *B01J 21/12* (2013.01); *C01B 32/159* (2017.08); *B82Y 30/00* (2013.01);
(Continued)

(58) Field of Classification Search
CPC . C01B 32/162; C01B 32/159; C01B 2202/02; C01B 2202/30; C01B 2202/36;
(Continued)

(56) References Cited

U.S. PATENT DOCUMENTS

2005/0074392 A1* 4/2005 Yang ..................... B82Y 40/00
                                                            423/447.3
2008/0107587 A1    5/2008 Yumura et al.
(Continued)

FOREIGN PATENT DOCUMENTS

CN    1863593 A    11/2006
CN    104395233 A    3/2015
(Continued)

OTHER PUBLICATIONS

Aghababazadeh, et al., Synthesis of carbon nanotubes on alumina-based supports with different gas flow rates by CCVD method, J. Phys.: Conf. Ser. 2006; 26(135): 135-138 (Year: 2006).*
(Continued)

*Primary Examiner* — Daniel C. McCracken
(74) *Attorney, Agent, or Firm* — Knobbe, Martens, Olson & Bear, LLP

(57) ABSTRACT

Provided is a method for highly efficiently producing highly pure single-walled carbon nanotubes. This method for producing carbon nanotubes by fluidized CVD includes: a step for heating a material (A) to 1200° C. or higher, in which the total mass of $Al_2O_3$ and $SiO_2$ constitutes at least 90% of the total mass of the material (A) and the mass ratio of $Al_2O_3$/$SiO_2$ is in the range of 1.0-2.3; and a step for bringing a gas,
(Continued)

which is present in the environment in which the material (A) is being heated to 1200° C. or higher, into contact with a feed gas to generate carbon nanotubes.

10 Claims, 1 Drawing Sheet

(51) Int. Cl.
*B01J 21/12* (2006.01)
*B82Y 30/00* (2011.01)
*B82Y 40/00* (2011.01)

(52) U.S. Cl.
CPC ........... *B82Y 40/00* (2013.01); *C01B 2202/02* (2013.01); *C01B 2202/30* (2013.01); *C01B 2202/36* (2013.01); *C01P 2006/11* (2013.01)

(58) Field of Classification Search
CPC ..... C01B 32/16; C01B 32/158; C01B 32/164; C01B 32/166; C01B 32/168; C01B 32/17; C01B 32/172; C01B 32/174; C01B 32/176; C01B 32/178; C01B 2202/00; C01B 2202/04; C01B 2202/06; C01B 2202/08; C01B 2202/10; C01B 2202/20; C01B 2202/22; C01B 2202/24; C01B 2202/26; C01B 2202/28; C01B 2202/32; C01B 2202/34; B01J 21/12; B82Y 30/00; B82Y 40/00; C01P 2006/11; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

U.S. PATENT DOCUMENTS

| | | |
|---|---|---|
| 2008/0153691 A1 | 6/2008 | Jung et al. |
| 2015/0147263 A1 | 5/2015 | Noda et al. |
| 2018/0016147 A1 | 1/2018 | Kwon et al. |
| 2019/0046959 A1 | 2/2019 | Noda et al. |

FOREIGN PATENT DOCUMENTS

| | | | | |
|---|---|---|---|---|
| EP | 3 093 910 A1 | 11/2016 | | |
| EP | 3093910 | * 11/2016 | ............ | H01M 4/587 |
| JP | 2003-520176 A | 7/2003 | | |
| JP | 2007-246309 A | 9/2007 | | |
| JP | 4968643 B2 | 6/2008 | | |
| JP | 2011-037677 A | 2/2011 | | |
| JP | 5046078 B2 | 10/2012 | | |
| WO | WO 01/49599 A2 | 7/2001 | | |
| WO | WO 2015/105167 A1 | 7/2015 | | |
| WO | WO 2016/135328 | * 9/2016 | ............ | C01B 31/04 |
| WO | WO 2017/145950 A1 | 8/2017 | | |

OTHER PUBLICATIONS

Campos-Delgado, et al., Chemical Vapor Deposition Synthesis of N-, P-, and Si-Doped Single-Walled Carbon Nanotubes, ACS Nano 2010; 4(3): 1696-1702 (Year: 2010).*

International Search Report in PCT/JP2019/029533, dated Oct. 21, 2019.

Office Action in Counterpart Chinese Patent Application No. 201980050383.4 dated Feb. 15, 2023.

Aghababazadeh, R et al., "Synthesis of carbon nanotubes on alumina-based supports with different gas flow rates by CCVD method", *Journal of Physics: Conference Series* 26 (2006) 135-138.

* cited by examiner

METHOD FOR PRODUCING CARBON NANOTUBES

TECHNICAL FIELD

The present invention relates to a method for efficiently producing carbon nanotubes.

BACKGROUND ART

Carbon nanotubes are tubular materials having a nanometer-sized diameter that are composed only of carbon atoms. They have been attracting attention in terms of properties such as conductivity, thermal conductivity, mechanical strength, and chemical properties that are derived from their structural characteristics, and their practical use has been studied in various applications including the fields of electronics and energy.

There are three main methods for synthesizing carbon nanotubes: an arc discharge method, a laser evaporation method, and a chemical vapor deposition (CVD) method. Of these, unlike the arc discharge method and the laser evaporation method, the CVD method uses a gaseous carbon source instead of a solid carbon source, and therefore, the carbon source can be continuously injected into the reactor, which is a suitable method for mass synthesis. In addition, it is an excellent synthesis method in terms of high purity of the obtained carbon nanotubes and low production cost.

Of the CVD methods, a fluidized CVD is a method particularly suitable for synthesizing single-walled carbon nanotubes having many excellent properties such as extremely high electrical and thermal conductivity as compared with multi-walled carbon nanotubes.

More specific examples of the method for producing carbon nanotubes by the fluidized CVD include a method for producing single-walled carbon nanotubes in which by-production of amorphous carbon is suppressed (U.S. Pat. No. 5,046,078), a method for producing high-purity single-walled carbon nanotubes (U.S. Pat. No. 4,968,643), and a method for producing single-walled carbon nanotubes in a high yield (Japanese Patent Laid-open Publication No. 2007-246309).

High-purity single-walled carbon nanotubes can be produced by these carbon nanotube production methods. However, the yield of carbon nanotubes has been only a few percent, and these methods have failed to mass-produce single-walled carbon nanotubes.

PRIOR ART DOCUMENTS

Patent Documents

Patent Document 1: U.S. Pat. No. 5,046,078
Patent Document 2: U.S. Pat. No. 4,968,643
Patent Document 3: Japanese Patent Laid-open Publication No. 2007-246309

SUMMARY OF THE INVENTION

Problems to be Solved by the Invention

An object of the present invention is to provide a method for producing high-purity single-walled carbon nanotubes with high efficiency.

Means for Solving the Problem

The present inventor has found that, in the method for producing carbon nanotubes by the fluidized CVD, high-purity single-walled carbon nanotubes can be produced with high efficiency by heating a material (A) containing $Al_2O_3$ and $SiO_2$ at a specific composition to 1200° C. or higher, and bringing a gas present in the environment in which the material (A) is being heated to 1200° C. or higher, into contact with a feed gas for carbon nanotubes.

The present invention is completed by further studies based on such findings.

That is, the present invention relates to the following.

Item 1. A method for producing carbon nanotubes by a fluidized CVD, including:
   a step of heating a material (A) to 1200° C. or higher, in which a sum of masses of $Al_2O_3$ and $SiO_2$ constitutes at least 90% of the total mass of the material (A) and the mass ratio of $Al_2O_3/SiO_2$ is in a range of 1.0 to 2.3; and
   a step of bringing a gas present in an environment in which the material (A) is being heated to 1200° C. or higher, into contact with a feed gas for carbon nanotubes to generate carbon nanotubes.

Item 2. The method for producing carbon nanotubes according to Item 1, in which the material (A) heated to 1200° C. or higher coexists with the feed gas for carbon nanotubes.

Item 3. The method for producing carbon nanotubes according to Item 1, further including a step of mixing a gas present in the environment in which the material (A) is being heated to 1200° C. or higher, and a feed gas for carbon nanotubes.

Item 4. The method for producing carbon nanotubes according to any one of Items 1 to 3, in which the material (A) has a bulk density in a range of 2.2 to 3.0 g/cm³.

Item 5. The method for producing carbon nanotubes according to any one of Items 1 to 4, in which the mass ratio of $Al_2O_3/SiO_2$ of the material (A) is in a range of 1.3 to 1.9.

Item 6. The method for producing carbon nanotubes according to any one of Items 1 to 5, in which the feed gas contains a carbon source and a catalyst.

Item 7. The method for producing carbon nanotubes according to any one of Items 1 to 6, in which the obtained carbon nanotubes have a diameter of 2.5 nm or less.

Item 8. The method for producing carbon nanotubes according to any one of Items 1 to 7, in which 60% or more of the obtained carbon nanotubes are single-walled carbon nanotubes.

Item 9. A carbon nanotube composition containing 0.1% by mass or more of silicon.

Advantages of the Invention

According to the method for producing carbon nanotubes according to the present invention, high-purity single-walled carbon nanotubes can be produced with high efficiency.

EMBODIMENTS OF THE INVENTION

Figure 1:
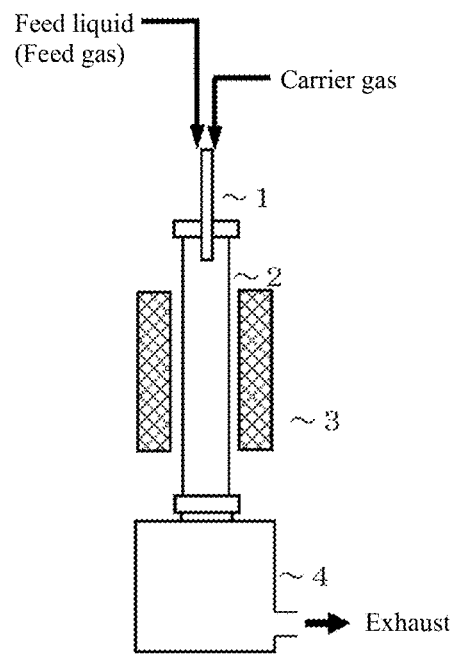
FIG. 1 is a schematic view showing an apparatus for producing carbon nanotubes by a fluidized CVD.

Hereinafter, a method for producing carbon nanotubes according to the present invention will be described in detail.

The method for producing carbon nanotubes according to the present invention is a method for producing carbon nanotubes by a fluidized CVD.

The fluidized CVD is one of the CVD methods, in which a catalyst is introduced into a heated reaction tube without using a substrate as a support of the catalyst, is allowed to chemically react with a carbon source in a state of being suspended and flowed in a vapor phase in which a carrier gas flows, and growing CNTs in a suspended state.

The method for producing carbon nanotubes (CNTs) of the present invention includes a step of heating a material (A) to 1200° C. or higher; and a step of bringing a gas present in the environment in which the material (A) is being heated to 1200° C. or higher, (hereinafter referred to as "heated environmental gas of material (A)" in some cases) into contact with a feed gas for carbon nanotubes to generate carbon nanotubes. Here, the material (A) is characterized in that the sum of masses of $Al_2O_3$ and $SiO_2$ constitutes at least 90% of the total mass of the material (A) and the mass ratio of $Al_2O_3/SiO_2$ is in the range of 1.0 to 2.3

In the method for producing carbon nanotubes of the present invention, high-purity single-walled carbon nanotubes can be produced with high efficiency by bringing the heated environmental gas of material (A) into contact with the feed gas for carbon nanotubes. The heated environmental gas of material (A) is a gas obtained by heating the material (A) to 1200° C. or higher in the gas atmosphere.

The method of bringing the heated environmental gas of material (A) into contact with the feed gas for carbon nanotubes is not particularly limited. For example, a method can be adopted in which the material (A) heated to 1200° C. or higher coexists with the feed gas for carbon nanotubes. In this method, for example, the material (A) is placed in the reaction tube used in the fluidized CVD, and the feed gas is introduced into the reaction tube with the material (A) heated to 1200° C. or higher, thereby bringing the heated environmental gas of material (A) into contact with the feed gas to generate carbon nanotubes. In addition, at least the inner surface of the reaction tube used in the fluidized CVD is composed of the material (A), and the feed gas is introduced into the reaction tube while the reaction tube is heated to 1200° C. or higher, thereby bringing the heated environmental gas (A) into contact with the feed gas to generate carbon nanotubes.

Further, as the method of bringing the heated environmental gas of material (A) into contact with the feed gas for carbon nanotubes, a method of mixing the heated environmental gas of material (A) and the feed gas for carbon nanotubes can also be adopted. Specifically, for example, a method can be adopted in which a heated environmental gas of material (A) and a feed gas for carbon nanotubes are prepared, and these gases are introduced into the reaction tube to be used in the fluidized CVD.

The sum of masses of $Al_2O_3$ and $SiO_2$ of the material (A) is 90% or more of the total mass (100%) of the material (A). The sum of masses of $Al_2O_3$ and $SiO_2$ is more preferably 95% or more. As other main components constituting the material (A), $Fe_2O_3$, $K_2O$, $Na_2O$, and the like can be exemplified, and the material (A) may contain about 0.5% of $Fe_2O_3$, about 1% of $K_2O$, and about 0.2% of $Na_2O$.

A material with a ratio of $Al_2O_3/SiO_2$ (mass ratio) in the range of 1.0 to 2.3 is used as the material (A). The lower limit of $Al_2O_3/SiO_2$ (mass ratio) is preferably 1.2 or more, and more preferably 1.3 or more. The upper limit of $Al_2O_3/SiO_2$ (mass ratio) is preferably 2.1 or less, and more preferably 1.9 or less.

The lower limit of the bulk density of the material (A) is preferably 2.2 g/cm³ or more, more preferably 2.4 g/cm³ or more, and the upper limit thereof is preferably 3.0 g/cm³ or less, and more preferably 2.8 g/cm³.

As the carbon source used in the fluidized CVD, a liquid or gaseous carbon compound can be used. As specific examples, methane, ethane, propane, ethylene, propylene, acetylene and the like are preferably used as the gaseous carbon compound. As the liquid carbon compound, alcohols such as methanol and ethanol, aliphatic hydrocarbons such as hexane, cyclohexane, and decalin, and aromatic hydrocarbons such as benzene, toluene, and xylene are preferably used. Particularly preferably, ethylene, benzene, toluene, and decalin are used. Any carbon compound may be mixed or used in combination.

In the method for producing carbon nanotubes of the present invention, a catalyst is preferably used. The catalyst is preferably a transition metal compound or transition metal fine particles. The transition metal compound is capable of producing transition metal fine particles by thermal decomposition or the like. The transition metal (transition element) is preferably iron, cobalt, nickel, palladium, platinum, or rhodium, and preferably iron, cobalt, or nickel. The transition metal compound is preferably a metallocene compound such as ferrocene, cobaltocene or nickelocene, a chloride such as iron chloride or cobalt chloride, a metal acetylacetonate such as acetylacetonato iron, or a metal carbonyl such as iron carbonyl, more preferably a metallocene compound such as ferrocene, cobaltocene, or nickelocene, and particularly preferably ferrocene.

The transition metal fine particle has a particle size of preferably 0.1 to 50 nm, and more preferably 0.3 to 15 nm. The particle size of the fine particle can be measured using a transmission electron microscope.

A method for feeding the catalyst (a method of incorporating a catalyst into the feed gas for carbon nanotubes or the heated environmental gas of material (A) to generate carbon nanotubes in the presence of the catalyst) is not particularly limited as long as the catalyst such as a transition metal compound or transition metal fine particles can be fed into the reaction tube, and a method of feeding a catalyst in a state in which the transition metal compound is dissolved in a solvent or a method of introducing a catalyst into the reaction tube in a state in which the transition metal compound is vaporized can be exemplified. In the present invention, it is preferable that the feed gas for carbon nanotubes contain a carbon source and a catalyst.

In the method of feeding a catalyst in a state in which the transition metal compound is dissolved in a solvent, the solvent is not particularly limited, but a liquid carbon compound used as a carbon source is preferable. Specifically, a method of introducing a solution containing a carbon compound and a catalyst into the reaction tube and vaporizing the solution to obtain a feed gas, or a method of vaporizing a solution containing a carbon compound and a catalyst to obtain a feed gas and introducing the feed gas into the reaction tube is preferable.

In the production method of the present invention, it is preferred to generate carbon nanotubes in the presence of a sulfur compound in order to promote the reaction for generating carbon nanotubes. Examples of the sulfur compound include an organic sulfur compound and an inorganic sulfur compound. Examples of the organic sulfur compound include thiophene, thianaphthene, and benzothiophene, and examples of the inorganic sulfur compound include elemental sulfur, carbon disulfide, and hydrogen sulfide.

A method for feeding the sulfur compound (a method of incorporating the sulfur compound into the feed gas for carbon nanotubes or the heated environmental gas of material (A)) is not particularly limited, but when the sulfur compound is incorporated into the feed gas, a method of further mixing the sulfur compound with a solution containing a carbon source and a catalyst can be exemplified.

As the mass ratio of the carbon source, catalyst, and sulfur compound, it is preferred to be 1 to 20 parts by mass of the catalyst and 0.1 to 10 parts by mass of the sulfur compound with respect to 100 parts by mass of the carbon source.

As the carrier gas, an inert gas such as hydrogen, argon, helium, or nitrogen can be used, and these may be mixed and used. The environment for heating the material (A) to 1200° C. or higher may be a carrier gas atmosphere or a mixed gas atmosphere of the carrier gas and the feed gas. Specifically, in the method of bringing the heated environmental gas of material (A) into contact with the feed gas for carbon nanotubes, for example, when the method in which the material (A) heated to 1200° C. or higher coexists with the feed gas for carbon nanotubes is adopted, the environment for heating the material (A) to 1200° C. or higher is a mixed gas atmosphere of the carrier gas and the-feed gas. Further, when the method of mixing the heated environmental gas of material (A) and the feed gas for carbon nanotubes is adopted, the gas obtained by heating the material (A) to 1200° C. or higher in the carrier gas atmosphere can be mixed with the feed gas.

CNTs can be preferably generated at a linear velocity of the carrier gas in the range of 400 to 2500 cm/min, depending upon the temperature of the reaction region and the effective heating length of the reactor. The linear velocity is more preferably in the range of 600 to 1600 cm/min.

CNTs can be preferably generated at a molar concentration of carbon atoms in the carbon source in the range of 0.30 mmol/L to 1.1 mmol/L with respect to the carrier gas in the standard state (0° C., 1 atm). The molar concentration is more preferably from 0.45 mmol/L to 0.80 mmol/L.

In the present invention, the reactor is not particularly limited, but a vertical reactor is preferably used to react. As the reactor, for example, a reactor having a tubular shape can be preferably used.

In the present invention, the reaction tube can be used without particular limitation as long as it has a heat resistance of 1200° C. or higher and can be used safely. As described above, at least the inner surface of the reaction tube or the entire reaction tube may be composed of the material (A).

The heating temperature of the material (A) may be 1200° C. or higher, preferably from about 1200 to about 1800° C., and more preferably from about 1300° C. to about 1500° C. Further, when at least the inner surface of the reaction tube is composed of the material (A), the temperature of the reaction region is maintained at 1200 to 1800° C. by heating a part or the whole of the reaction tube, and thus, the catalyst and the carbon source can be preferably reacted with each other. More preferably, the temperature of the reaction region is maintained in the range of 1300° C. to 1500° C.

The temperature at which the heated environmental gas of material (A) is brought into contact with the feed gas for carbon nanotubes to generate carbon nanotubes is not particularly limited, but is preferably 800° C. or higher, more preferably 1200° C. or higher, even more preferably from about 1200 to about 1800° C., and even more preferably from about 1300° C. to about 1500° C. In the method of bringing the heated environmental gas of material (A) into contact with the feed gas for carbon nanotubes, for example, when the method in which the material (A) heated to 1200° C. or higher coexists with the feed gas for carbon nanotubes is adopted, the heating temperature of the material (A) is substantially the same as the temperature at which the carbon nanotubes are generated.

In the present invention, it is preferred to use a reaction tube formed of the material (A) in order to further improve the yield of carbon nanotubes.

The carbon nanotubes produced by the production method of the present invention has a carbon purity of preferably 80% or more, more preferably 84% or more, and particularly preferably 88% or more.

An intensity ratio G/D of a G band and a D band of the carbon nanotubes produced by the production method of the present invention is preferably 60 or more, preferably 65 or more, and particularly preferably 70 or more. The G/D ratio is measured by a Raman spectroscopic device and calculated from the peak intensity ratio of the G band (near 1590 cm$^{-1}$) and the D band (near 1300 cm$^{-1}$) in the Raman spectrum obtained by the resonance Raman scattering measurement (excitation wavelength 532 nm). It is shown that the higher the G/D ratio, the smaller the amount of defects in the structure of the carbon nanotubes.

The carbon nanotubes produced by the production method of the present invention has a diameter of preferably 3.0 nm or less, more preferably 2.5 nm or less, and particularly preferably 2.2 nm or less.

The carbon nanotubes of the present invention may contain single-walled carbon nanotubes with high purity, and may also contain multi-walled carbon nanotubes in addition to the single-walled carbon nanotubes. For example, 60% by mass or more of the carbon nanotubes obtained by the production method of the present invention are single-walled carbon nanotubes.

Further, the carbon nanotube of the present invention is preferably a carbon nanotube composition containing 0.1% by mass or more of silicon. The upper limit is not particularly limited, but a carbon nanotube composition containing 5% by mass or less of silicon is preferable, and a carbon nanotube composition containing 2.5% by mass or less is more preferable.

EXAMPLES

Hereinafter, the present invention will be described in more detail with reference to Examples, but the present invention is not limited to any examples.

Figure 2:
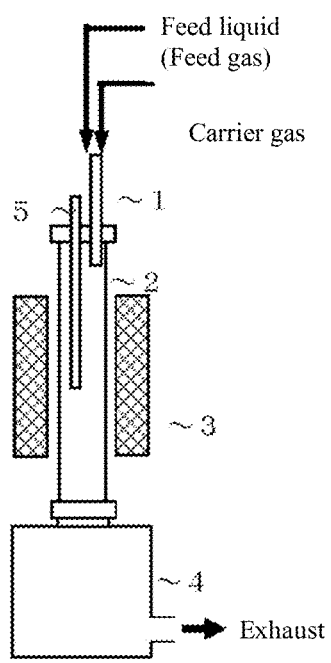
FIG. 2 is a schematic view showing an apparatus for producing carbon nanotubes by a fluidized CVD.

Carbon nanotubes were produced using an apparatus shown in FIG. 1 or 2. In FIG. 1, 1 denotes a feed spray nozzle, 2 denotes a reaction tube, 3 denotes a heater, and 4 denotes a carbon nanotube collector. In FIGS. 2, 1 to 4 denote the same as in FIG. 1, and 5 denotes an insertion material.

Carbon nanotubes were synthesized using the following reagents and the like.

Toluene: Kanto Chemical Co., Inc.
Ferrocene: Wako Pure Chemical Industries, Ltd.
Thiophene: Tokyo Chemical Industry Co., Ltd.
Ethylene: Sumitomo Seika Chemicals Co., Ltd.
Hydrogen: Iwatani Corporation The carbon nanotubes were evaluated using the following analyzer.

(Thermogravimetric Analysis)

Using a differential thermogravimetric simultaneous measuring device (Hitachi High-Tech Science STA7200RV), about 7 mg of a sample was heated from room temperature to 900° C. at an air flow rate of 200 cc/min at a heating rate of 10° C./min, and then the rate of weight loss in the temperature range from room temperature to 900° C. was evaluated.

(Raman Spectroscopic Device)

Measurements were performed at a laser wavelength of 532 nm using a laser Raman microscope (Nanophoton Corporation, RAMANtouch VIS-NIR-DIS). The diameter (D) of the carbon nanotubes was calculated from the RBM (Radial Breathing Mode) peak (100 to 350 cm$^{-1}$) co using the following equation (1).

$$D(nm)=248/\omega \quad (1)$$

The intensity ratio G/D of the G band and the D band, which represents the crystallinity of carbon nanotubes, was calculated from the peak intensity ratio of the G band (near 1590 cm$^{-1}$) and the D band (near 1300 cm$^{-1}$).

(Elemental Analysis)

Analysis was performed by alkali melting-Inductively Coupled Plasma (ICP) emission spectrometry using an ICP-Atomic Emission Spectroscopy (ICP-AES) system. Specifically, ICP analysis was performed as follows: $Na_2CO_3$ as an alkali was added to ash which was obtained by heating CNTs to 800° C. in the air, the temperature was increased to 900° C. to melt the ash, the molten ash was cooled, and thereafter, pure water was added thereto to obtain a test liquid for ICP analysis. The Si content (mass %) contained in CNTs was evaluated.

(Transmission Electron Micrograph)

CNT was dispersed in ethanol using an ultrasonic bath, and the dispersion was dropped onto a grid and dried, and evaluated using JEM-2010 available from JEOL Ltd. The abundance ratio of single-walled CNTs (SWNTs) was evaluated by observing 100 CNTs in a viewing field of 20 nm×20 nm.

(Synthesis of Carbon Nanotubes)

Example 1

Carbon nanotubes were synthesized using the carbon nanotube manufacturing apparatus shown in FIG. 2. Using an insertion material 5 with $Al_2O_3+SiO_2$ mass=96%, $Al_2O_3/SiO_2$=1.4, a bulk density of 2.7, an outer diameter of 10 mm, and a length of 1000 mm, and a reaction tube 2 with $Al_2O_3+SiO_2$ mass=99%, $Al_2O_3/SiO_2$=2.7, a bulk density of 3.1, an inner diameter of 50 mm, an outer diameter of 60 mm, and a length of 1400 mm, argon gas was flowed into the tube, and the reaction tube was heated to 1400° C. by a heater 3 (effective heating length 900) in an argon stream. Thereafter, instead of feeding argon, hydrogen gas was flowed as a carrier gas at 15 NL/min. Subsequently, a feed liquid (a solution of ferrocene and thiophene dissolved in toluene at a molar ratio of 100:4:1) was fed into the reaction tube at 200 μL/min from a feed spray nozzle 1.

As a result of the reaction, a deposit of black carbon nanotubes was formed in a carbon nanotube collector 4 placed in the lower portion of the reaction tube. The carrier gas was changed from hydrogen to argon and then cooled to room temperature. Thereafter, the deposit was collected from the collector, and assigned to the carbon mass in the used toluene to determine the yield. Then, the carbon purity was evaluated using a thermogravimetric analyzer, the diameter and G/D were evaluated using a Raman spectrometer, the Si content was evaluated using an ICP emission spectrometer, and the SWNT abundance ratio was evaluated using a transmission electron microscope.

Example 2

The same operation as in Example 1 was performed except that the heating temperature was set to 1300° C.

Example 3

The same operation as in Example 1 was performed except that the heating temperature was set to 1200° C.

Example 4

Carbon nanotubes were synthesized using the carbon nanotube manufacturing apparatus shown in FIG. 1. Using the reaction tube 2 with $Al_2O_3+SiO_2$ mass=98%, $Al_2O_3/SiO_2$=1.8, a bulk density of 2.7, an inner diameter of 52 mm, an outer diameter of 60 mm, and a length of 1400 mm, argon gas was flowed into the tube, and the reaction tube was heated to 1400° C. by the heater 3 (effective heating length 900) in an argon stream. Thereafter, instead of feeding argon, hydrogen gas was flowed as a carrier gas at 15 NL/min. Subsequently, a feed liquid (a solution of ferrocene and thiophene dissolved in toluene at a molar ratio of 100:4:1) was fed into the reaction tube at 200 μL/min from the feed spray nozzle 1.

The obtained carbon nanotubes was evaluated in the same manner as in Example 1.

Example 5

The same operation as in Example 4 was performed except that the heating temperature was set to 1300° C.

Example 6

The same operation as in Example 4 was performed except that the heating temperature was set to 1200° C.

Example 7

The same operation as in Example 4 was performed except that the reaction tube 2 with $Al_2O_3+SiO_2$ mass=97%, $Al_2O_3/SiO_2$=1.4, a bulk density of 2.6, an inner diameter of 52 mm, an outer diameter of 60 mm, and a length of 1400 mm was heated to 1200° C.

Example 8

The same operation as in Example 7 was performed except that the heating temperature was set to 1350° C.

Example 9

The same operation as in Example 7 was performed except that in combination with the feed liquid (a solution of ferrocene and thiophene dissolved in toluene at a molar ratio of 100:4:1), ethylene gas was fed into the reaction tube at 40 NmL/min from the feed spray nozzle 1. The yield was calculated by assigning the sum of the carbon masses of toluene and ethylene used.

Comparison Example 1

The same operation as in Example 1 was performed except that the insertion material 5 with $Al_2O_3+SiO_2$ mass=99%, $Al_2O_3/SiO_2$=830, a bulk density of 3.9, an outer diameter of 10 mm, and a length of 1000 mm was used.

Comparative Example 2

The same operation as in Comparative Example 1 was performed except that the heating temperature was set to 1100° C.

Comparative Example 3

The same operation as in Example 4 was performed except that the reaction tube with $Al_2O_3+SiO_2$ mass=99%, $Al_2O_3/SiO_2$=2.7, a bulk density of 3.1, an inner diameter of 50 mm, an outer diameter of 60 mm, and a length of 1400 mm was used.

Comparative Example 4

The same operation as in Comparative Example 3 was performed except that the heating temperature was set to 1200° C.

Comparative Example 5

The same operation as in Example 4 was performed except that the reaction tube with $Al_2O_3+SiO_2$ mass=99%, $Al_2O_3/SiO_2$=830, a bulk density of 3.9, an inner diameter of 50 mm, an outer diameter of 60 mm, and a length of 1400 mm was used.

Comparative Example 6

The same operation as in Example 9 was performed except that the reaction tube with $Al_2O_3+SiO_2$ mass=99%, $Al_2O_3/SiO_2$=2.7, a bulk density of 3.1, an inner diameter of 50 mm, an outer diameter of 60 mm, and a length of 1400 mm was used.

Comparative Example 7

The same operation as in Example 4 was performed except that the heating temperature was set to 1100° C.

The conditions of Examples and Comparative Examples are summarized in Table 1, and the evaluation results are summarized in Table 2.

TABLE 1

| | Feed material (mol ratio) | | | | Heating zone | | | | | | |
| | | | | | Insertion material 5 | | | Reaction tube | | | |
| | Toluene | Ethylene | Ferrocene | Thiophene | A + S | A/S | Bulk density | A + S | A/S | Bulk density | Temperature (° C.) |
|---|---|---|---|---|---|---|---|---|---|---|---|
| Example 1 | 100 | 0 | 4 | 1 | 96 | 1.4 | 2.7 | 99 | 2.7 | 3.1 | 1400 |
| Example 2 | 100 | 0 | 4 | 1 | 96 | 1.4 | 2.7 | 99 | 2.7 | 3.1 | 1300 |
| Example 3 | 100 | 0 | 4 | 1 | 96 | 1.4 | 2.7 | 99 | 2.7 | 3.1 | 1200 |
| Example 4 | 100 | 0 | 4 | 1 | — | | | 98 | 1.8 | 2.7 | 1400 |
| Example 5 | 100 | 0 | 4 | 1 | — | | | 98 | 1.8 | 2.7 | 1300 |
| Example 6 | 100 | 0 | 4 | 1 | — | | | 98 | 1.8 | 2.7 | 1200 |
| Example 7 | 100 | 0 | 4 | 1 | — | | | 97 | 1.4 | 2.6 | 1200 |
| Example 8 | 100 | 0 | 4 | 1 | — | | | 97 | 1.4 | 2.6 | 1350 |
| Example 9 | 100 | 106 | 4 | 1 | — | | | 98 | 1.8 | 2.7 | 1400 |
| Comparative Example 1 | 100 | 0 | 4 | 1 | 99 | 830 | 3.9 | 99 | 2.7 | 3.1 | 1400 |
| Comparative Example 2 | 100 | 0 | 4 | 1 | 96 | 1.4 | 2.7 | 99 | 2.7 | 3.1 | 1100 |
| Comparative Example 3 | 100 | 0 | 4 | 1 | — | | | 99 | 2.7 | 3.1 | 1400 |
| Comparative Example 4 | 100 | 0 | 4 | 1 | — | | | 99 | 2.7 | 3.1 | 1200 |
| Comparative Example 5 | 100 | 0 | 4 | 1 | — | | | 99 | 830 | 3.9 | 1350 |
| Comparative Example 6 | 100 | 106 | 4 | 1 | — | | | 99 | 2.7 | 3.1 | 1400 |
| Comparative Example 7 | 100 | 0 | 4 | 1 | — | | | 98 | 1.8 | 2.7 | 1100 |

TABLE 2

| | Yield (%) | Diameter (nm) | G/D | Carbon purity (%) | Si content (%) | SWNT (%) |
|---|---|---|---|---|---|---|
| Example 1 | 11 | 2.0 | 75 | 94 | 0.4 | 75 |
| Example 2 | 8 | 2.0 | 75 | 92 | 0.3 | 79 |
| Example 3 | 5 | 1.9 | 72 | 91 | 0.2 | 81 |
| Example 4 | 21 | 2.0 | 77 | 95 | 1.4 | 74 |
| Example 5 | 15 | 2.0 | 80 | 93 | 0.5 | 71 |
| Example 6 | 5 | 2.0 | 85 | 90 | 0.2 | 83 |
| Example 7 | 5 | 1.9 | 76 | 91 | 0.3 | 91 |
| Example 8 | 24 | 2.0 | 71 | 96 | 1.2 | 65 |
| Example 9 | 7 | 1.5 | 126 | 92 | 1.6 | 96 |
| Comparative Example 1 | 1 | 1.9 | 60 | 37 | <0.1 | 63 |
| Comparative Example 2 | 1 | 1.9 | 59 | 33 | <0.1 | 57 |
| Comparative Example 3 | 2 | 2.0 | 67 | 49 | <0.1 | 48 |
| Comparative Example 4 | 2 | 1.9 | 64 | 35 | <0.1 | 54 |
| Comparative Example 5 | 1 | 1.9 | 58 | 42 | <0.1 | 62 |
| Comparative Example 6 | 1 | 1.5 | 53 | 40 | <0.1 | 78 |
| Comparative Example 7 | 1 | 1.9 | 60 | 45 | <0.1 | 87 |

DESCRIPTION OF REFERENCE SIGNS

1: Feed spray nozzle
2: Reaction tube
3: Heater
4: Carbon nanotube collector
5: Insertion material

The invention claimed is:

1. A method for producing a mixture comprising carbon nanotubes and 0.1-0.5% by mass of silicon by fluidized chemical vapor deposition (CVD), the method comprising:
heating an insertion material (A) in a reaction tube to 1200° C. or higher, wherein a sum of masses of $Al_2O_3$ and $SiO_2$ in the insertion material (A) constitutes at least 90% of a total mass of the insertion material (A) and wherein a mass ratio of $Al_2O_3/SiO_2$ in the insertion material (A) is in a range of 1.0 to 2.3; and
bringing a gas present in an environment in which the material (A) is being heated to 1200° C. or higher, into contact with a feed gas to generate the mixture.

2. The method for producing the mixture according to claim 1, wherein the material (A) heated to 1200° C. or higher coexists with the feed gas.

3. The method for producing the mixture according to claim 1, further comprising a step of mixing:
the gas present in the environment in which the material (A) is being heated to 1200° C. or higher, and
the feed gas.

4. The method for producing the mixture according to claim 1, wherein the material (A) has a bulk density in a range of 2.2 to 3.0 g/cm³.

5. The method for producing the mixture according to claim 1, wherein a mass ratio of $Al_2O_3/SiO_2$ of the material (A) is in a range of 1.3 to 1.9.

6. The method for producing the mixture according to claim 1, wherein the feed gas comprises a carbon source and a catalyst.

7. The method for producing the mixture according to claim 1, wherein the obtained carbon nanotubes have a diameter of 2.5 nm or less.

8. The method for producing the mixture according to claim 1, wherein 60% or more of the obtained carbon nanotubes are single-walled carbon nanotubes.

9. The method of claim 1, wherein the feed gas comprises ferrocene and thiophene.

10. The method of claim 9, wherein the feed gas is generated from a solution of ferrocene and thiophene dissolved in toluene at a molar ratio of 100:4:1.

* * * * *